(12) United States Patent
Cho (10) Patent No.: US 11,953,069 B2
(45) Date of Patent: Apr. 9, 2024

(54) SYSTEM AND METHOD OF EVALUATING PERFORMANCE OF VEHICLE DEVICE HAVING FRICTION COMPONENT

(71) Applicants: Hyundai Motor Company, Seoul (KR); Kia Motors Corporation, Seoul (KR)

(72) Inventor: Sung Hyun Cho, Whasung-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 665 days.

(21) Appl. No.: 17/096,737

(22) Filed: Nov. 12, 2020

(65) Prior Publication Data
US 2022/0034378 A1  Feb. 3, 2022

(30) Foreign Application Priority Data
Jul. 28, 2020 (KR) .......................... 10-2020-0093590

(51) Int. Cl.
*F16D 66/00* (2006.01)
*B60T 8/17* (2006.01)
*G01L 5/28* (2006.01)

(52) U.S. Cl.
CPC ........ *F16D 66/00* (2013.01); *F16D 2066/001* (2013.01); *F16D 2066/003* (2013.01); *F16D 2066/005* (2013.01); *F16D 2066/006* (2013.01); *F16D 2066/008* (2013.01)

(58) Field of Classification Search
CPC .............. F16F 66/00; F16F 2066/001; F16F 2066/003; F16F 2066/005; F16F 2066/006; F16F 2066/008; B60T 8/171; B60T 8/885; G01L 5/26; G01L 5/25
USPC ....................................................... 188/1.11 E
See application file for complete search history.

(56) References Cited

U.S. PATENT DOCUMENTS

| | | | | |
|---|---|---|---|---|
| 4,569,600 A * | 2/1986 | Preniczny | ............. | G01J 5/0821 188/1.11 R |
| 4,824,260 A * | 4/1989 | Novotny | ................ | F16D 66/00 188/1.11 R |
| 5,372,221 A * | 12/1994 | Jalbert | .................... | B60T 17/22 303/122.08 |
| 6,442,457 B1 * | 8/2002 | Jones | ....................... | G01L 5/28 701/33.2 |
| 6,680,672 B2 * | 1/2004 | Borugian | ............. | F16D 66/021 73/115.07 |
| 6,823,242 B1 * | 11/2004 | Ralph | ................... | B60T 17/228 701/19 |

(Continued)

*Primary Examiner* — Robert A. Siconolfi
*Assistant Examiner* — James K Hsiao
(74) *Attorney, Agent, or Firm* — MORGAN, LEWIS & BOCKIUS LLP (57) ABSTRACT

A system and method of accurately evaluating the performance of a vehicle device having a friction component, including a brake disc, a clutch disc, or the like, may be achieved by predicting the accurate friction coefficient of the friction component in consideration of changes in the temperature, rotation speed, and hydraulic pressure of the friction component, and determining the operating torque of the vehicle device or system having the friction component through reflecting the predicted friction coefficient, during the performance evaluation simulation process of the vehicle device including the friction component.

18 Claims, 4 Drawing Sheets

(56) References Cited

U.S. PATENT DOCUMENTS

| | | | | |
|---|---|---|---|---|
| 7,165,657 | B2* | 1/2007 | Palladino | F16D 66/026 |
| | | | | 188/1.11 E |
| 7,694,555 | B2* | 4/2010 | Howell | B60T 17/221 |
| | | | | 73/129 |
| 10,495,169 | B2* | 12/2019 | Antanaitis | B60T 17/221 |
| 11,047,441 | B2* | 6/2021 | Antanaitis | F16D 66/027 |
| 2005/0212357 | A1* | 9/2005 | Adams | B60T 17/18 |
| | | | | 188/1.11 L |
| 2009/0125286 | A1* | 5/2009 | Waltz | F16D 65/847 |
| | | | | 703/5 |
| 2010/0235065 | A1* | 9/2010 | Logan | B60T 17/22 |
| | | | | 701/80 |
| 2011/0054758 | A1* | 3/2011 | Bae | F16D 66/00 |
| | | | | 701/92 |
| 2017/0082163 | A1* | 3/2017 | Serra | B60T 8/885 |
| 2017/0106995 | A1* | 4/2017 | Burte | B60T 17/221 |
| 2017/0210371 | A1* | 7/2017 | Fraser | B60T 17/22 |
| 2018/0106318 | A1* | 4/2018 | Cavanna | B60T 13/662 |
| 2018/0141534 | A1* | 5/2018 | Prehofer | F16D 66/02 |
| 2020/0102993 | A1* | 4/2020 | Antanaitis | B60T 17/22 |
| 2020/0232531 | A1* | 7/2020 | Robere | F16D 66/00 |

* cited by examiner

SYSTEM AND METHOD OF EVALUATING PERFORMANCE OF VEHICLE DEVICE HAVING FRICTION COMPONENT

CROSS REFERENCE TO RELATED APPLICATION

The present application claims priority to Korean Patent Application No. 10-2020-0093590, filed on Jul. 28, 2020, the entire contents of which is incorporated herein for all purposes by this reference.

BACKGROUND OF THE INVENTION

Field of the Invention

The present invention relates to a system and method for evaluating the performance of a vehicle device having a friction component, and more particularly, a system for evaluating the performance of a vehicle device having a friction component by accurately determining the operating torque reflecting the change in the friction coefficient of the friction component, and a method thereof.

Description of Related Art

The simulation items for evaluating the performance of a vehicle device having a friction component include a braking simulation for a brake system including a friction component such as a brake disc, a driving simulation for a transmission clutch system including a friction component such as a clutch disc, and the like.

In addition to the basic performance evaluation of the brake, the braking simulation refers to a process for testing various items such as brake heat capacity evaluation, braking distance evaluation, circuit driving lap time evaluation, and the like.

In general, hydraulic braking of a vehicle involves a process of supplying a hydraulic pressure to a wheel cylinder of a caliper, a process of pressing a brake pad using a piston portion of the wheel cylinder, and a process of performing frictional contact of the brake pad with the surface of the brake disc rotating along with a tire for performing practical braking.

At the present time, the friction coefficient of the brake disc changes continuously or non-linearly according to temperature, pressure, and speed.

That is, the friction coefficient of the brake disc continuously or non-linearly varies depending on the temperature of the disc, the amount of hydraulic pressure acting on the disc from the wheel cylinder and the brake pad, the rotation speed of the disc according to the vehicle speed, or the like.

Therefore, when determining the braking torque during the braking simulation process for evaluating the performance of the braking system of a vehicle, the friction coefficient parameter of the brake disc needs to be accurately reflected to improve the accuracy of the braking simulation.

As an example of the related art, when determining the braking torque for evaluating the performance of the braking system of a vehicle, the friction coefficient ($\mu$) of the disc has been reflected as a fixed average value (Constant).

However, when determining the braking torque, if the friction coefficient is reflected as a fixed average value (e.g., 0.34, 0.38, 0.42, etc.), the change in the friction coefficient according to the driving situation cannot be reflected, and thus the accuracy of the braking torque determination is degraded.

As another example of the related art, to determine the braking torque for evaluating the performance of the braking system, a method in which the friction coefficient ($\mu$) according to the temperature of the brake disc is constructed as map data, the brake disc temperature according to the driving condition is determined, and then the friction coefficient corresponding to the determined temperature is determined from the map data is applied.

However, although the friction coefficient according to the disc temperature may be reflected from the map data when the braking torque is determined, the change in the friction coefficient considering the change in the disc rotation speed and hydraulic pressure occurring simultaneously with the temperature change of the disc cannot be reflected, so a similar problem occurs in that the accuracy of the braking torque determination is degraded.

As a result, the braking torque determined by the related art method as described above has a difference compared to the actual braking torque, and thus the accuracy of the braking simulation result is inevitably degraded.

Therefore, to increase the accuracy of the braking simulation, a method of determining the braking torque by reflecting the accurate friction coefficient accounting for changes in the disc temperature, disc rotation speed, braking hydraulic pressure, and the like, which affect the change in the friction coefficient of the brake disc, is required.

Furthermore, to increase the accuracy of the driving simulation of the clutch system included in the automatic transmission, a method of determining the driving torque of the clutch system by reflecting the accurate friction coefficient accounting for changes in the temperature, rotation speed, driving hydraulic pressure, and the like, which affect the change in the friction coefficient of the clutch disc, is required.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a system and method of accurately evaluating the performance of a vehicle device having a friction component, including a brake disc, a clutch disc, or the like, by predicting the accurate friction coefficient of the friction component in consideration of changes in the temperature, rotation speed, and hydraulic pressure of the friction component, and determining the operating torque of the vehicle device or system having the friction component through reflecting the predicted friction coefficient, during the performance evaluation simulation process of the vehicle device including the friction component.

In various aspects of the present invention, various aspects according to various aspects of the present invention, there is provided a system for evaluating performance of a vehicle device having a friction component, the system including: a rotation speed determination unit configured to determine a rotation speed of the friction component of the vehicle device; a hydraulic pressure determination unit configured to determine a hydraulic pressure acting on the friction component; a temperature determination unit configured to determine a temperature of the friction component; a friction coefficient modeling unit configured to predict and output a friction coefficient on a basis of three or more input values, including the rotation speed determined by the rotation speed determination unit, the hydraulic pressure determined by the hydraulic pressure determination unit, and the temperature of the friction component determined by the temperature determination unit; and a torque determination unit configured to determine an operating torque of the friction component using the friction coefficient output from the friction coefficient modeling unit.

The friction component may be a brake disc being selectively in a frictional contact with a friction material of a brake system, or a clutch disc being selectively in a frictional contact with a friction material of a clutch system.

The rotation speed determination unit may be configured to determine a rotation speed of a brake disc of a brake system by reflecting a rotation radius of a tire to a vehicle speed detected by a vehicle speed sensor.

The temperature determination unit may be configured to determine a temperature of the brake disc as a difference between thermal energy and cooling energy of the brake disc during braking operation of the brake disc.

The thermal energy of the brake disc may be determined on the basis of: an environmental condition parameter including an ambient temperature and an initial temperature of the brake disc; a mechanical or thermal property parameter including mass, density, and specific heat; a specification parameter including a piston area of a wheel cylinder pressing a brake pad, and a friction area and an effective radius of the brake disc contacting with the brake pad, and the cooling energy of the brake disc may be determined on a basis of an amount of convective and radiational cooling of the brake disc.

The temperature determination unit may be an infrared temperature sensor configured to measure a temperature of the friction component.

The friction coefficient modeling unit may be configured to output a single friction coefficient determined on a basis of the input values including the rotation speed, the hydraulic pressure, and the temperature of the friction component, or otherwise construct and output a map of friction coefficients determined on a basis of three input values, including a variation in the rotation speed of the friction component, a variation in the hydraulic pressure acting on the friction component, and a variation in the temperature of the friction component.

The friction coefficient modeling unit may be provided for each friction component specification, and is replaceably mounted on a controller including the friction coefficient model mounting unit and the torque determination unit.

According to various aspects of the present invention, there is provided a method of evaluating performance of a vehicle device having a friction component, the method including: determining a rotation speed of the friction component; determining a hydraulic pressure acting on the friction component; determining a temperature of the friction component; predicting and outputting, by a controller, a friction coefficient matching the determined rotation speed, the determined hydraulic pressure, and the determined temperature of the friction component; and determining an operating torque of the friction component using the output friction coefficient.

The friction component may be a brake disc being selectively in a frictional contact with a friction material of a brake system, or a clutch disc being selectively in a frictional contact with a friction material of a clutch system.

In the determining a rotation speed of the friction component, the rotation speed of the brake disc may be determined by dividing a vehicle speed detected by a vehicle speed sensor by a rotation radius of a tire.

In the determining a temperature of the friction component, a temperature of the brake disc may be determined by a difference between thermal energy and cooling energy of the brake disc during braking operation of the brake disc.

The thermal energy of the brake disc may be determined on the basis of: an environmental condition parameter including an ambient temperature and an initial temperature of the brake disc; a mechanical or thermal property parameter including mass, density, and specific heat; a specification parameter including a piston area of a wheel cylinder pressing a brake pad, and a friction area and an effective radius of the brake disc contacting with the brake pad, and the cooling energy of the brake disc may be determined on a basis of an amount of convective and radiational cooling of the brake disc.

In the determining a temperature of the friction component, the temperature of the brake disc may be measured by an infrared temperature sensor.

The predicting and outputting a friction coefficient may include: inputting, to a friction coefficient model, three input values including the rotation speed, the hydraulic pressure, and the temperature of the friction component; and outputting a single friction coefficient exactly determined from the three input values in the friction coefficient model, or otherwise constructing and outputting a map of friction coefficients determined on a basis of the three input values.

The friction coefficient model may be provided for each friction component specification, and is replaceably mounted on a controller including the friction coefficient model mounting unit and the torque determination unit.

The map of friction coefficients may be stored in the controller to output a friction coefficient determined from the three input values when the friction coefficient model is not mounted on the friction coefficient model mounting unit of the controller.

The present invention has the following effects through the above-described configuration.

First, when evaluating the performance of the brake system including the brake disc among vehicle friction components, the friction coefficient of the brake disc is accurately predicted and output from the friction coefficient model in consideration of the change in the brake disc temperature, the brake disc rotation speed, the hydraulic pressure acting on the brake disc, etc., which affects the change in the friction coefficient of the brake disc depending on the driving situation of a vehicle, and the brake torque of the brake system is determined by reflecting the output friction coefficient, improving the accuracy of the performance evaluation of the vehicle brake system.

Second, when evaluating the performance of the transmission clutch system including the clutch disc among vehicle friction components, the friction coefficient of the clutch disc is accurately predicted and output from the friction coefficient model in consideration of the change in the clutch disc temperature, the clutch disc rotation speed, the hydraulic pressure acting on the clutch disc, etc., which affect the change in the friction coefficient of the clutch disc depending on the vehicle driving and the engine driving conditions, and the driving torque of the clutch system is determined by reflecting the output friction coefficient, improving the accuracy of the performance evaluation of the vehicle clutch system.

Third, the friction coefficient model is provided for each friction component specification and is mounted in a replaceable manner on the friction coefficient model mounting unit of the controller, easily evaluating the performance of the brake system or clutch system having friction components with different specifications.

Fourth, when the friction coefficient model is not provided in the friction coefficient model mounting unit of the controller, the friction coefficient map is constructed from the friction coefficient model and stored in the controller to employ a suitable friction coefficient therefrom.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of the present invention will be described in detail with reference to the accompanying drawings. Specific structures or functions described in the exemplary embodiments of the present invention are merely for illustrative purposes. Embodiments according to the concept of the present invention may be implemented in various forms, and it may be understood that they may not be construed as being limited to the exemplary embodiments described in various exemplary embodiments of the present invention, but include all of modifications, equivalents, or substitutes included in the spirit and scope of the present invention.

The friction coefficient of a brake disc of a brake system in the vehicle friction components varies continuously or non-linearly depending on the temperature of the brake disc, the rotation speed of the brake disc according to the vehicle speed, the amount of hydraulic pressure acting on the brake disc from a wheel cylinder and a brake pad, or the like.

Therefore, when determining the braking torque during the braking simulation process in the brake system performance evaluation items of a vehicle, the friction coefficient parameter of the brake disc needs to be accurately reflected.

Similarly, the friction coefficient of a clutch disc of a transmission clutch system in the vehicle friction components varies continuously or non-linearly depending on the temperature of the clutch disc, the rotation speed of the clutch disc according to the engine/transmission driving conditions, the amount of hydraulic pressure acting on the clutch disc during clutch-coupling, or the like.

Therefore, when determining the driving torque during the clutch system operating process in the transmission clutch system performance evaluation items of a vehicle, the friction coefficient parameter of the clutch disc needs to be accurately reflected.

Accordingly, the present invention is characterized in that in the performance evaluation simulation process of a brake system, including a brake disc, in vehicle friction components, or in the performance evaluation simulation process of a transmission clutch system, including a clutch disc, in vehicle friction components, the accurate friction coefficient of the friction component is predicted in consideration of changes in the temperature, rotation speed, and hydraulic pressure of the friction component, which affect the change in the friction coefficient of the friction component, and the braking torque of the brake system or the driving torque of the clutch system is accurately determined through reflecting the predicted friction coefficient, improving the accuracy of the performance evaluation of the vehicle device including the friction component.

Figure 1:
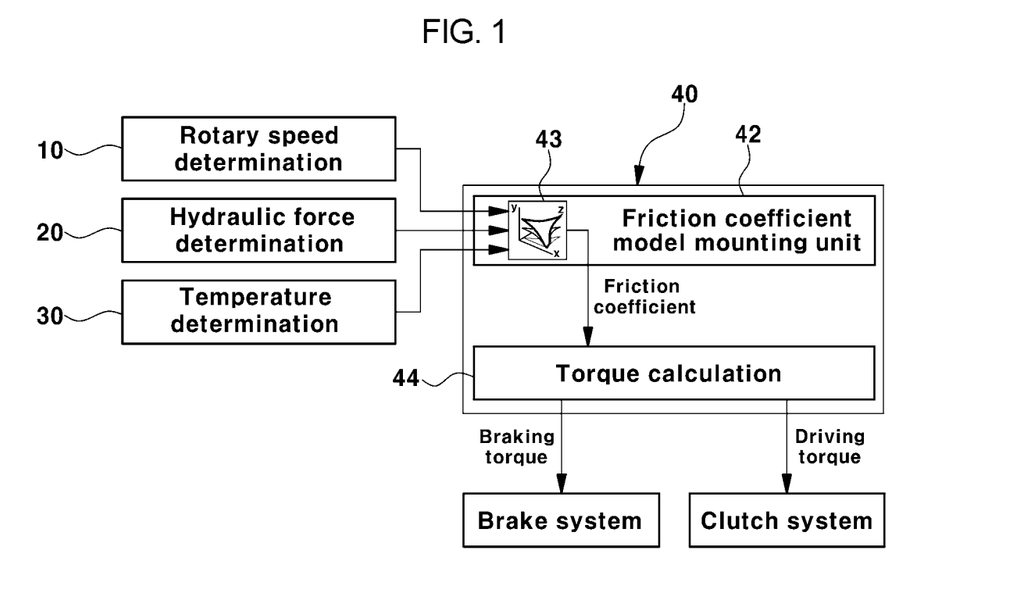
FIG. 1 is a block diagram illustrating a system for evaluating the performance of a vehicle device having a friction component according to various exemplary embodiments of the present invention.
Figure 2:
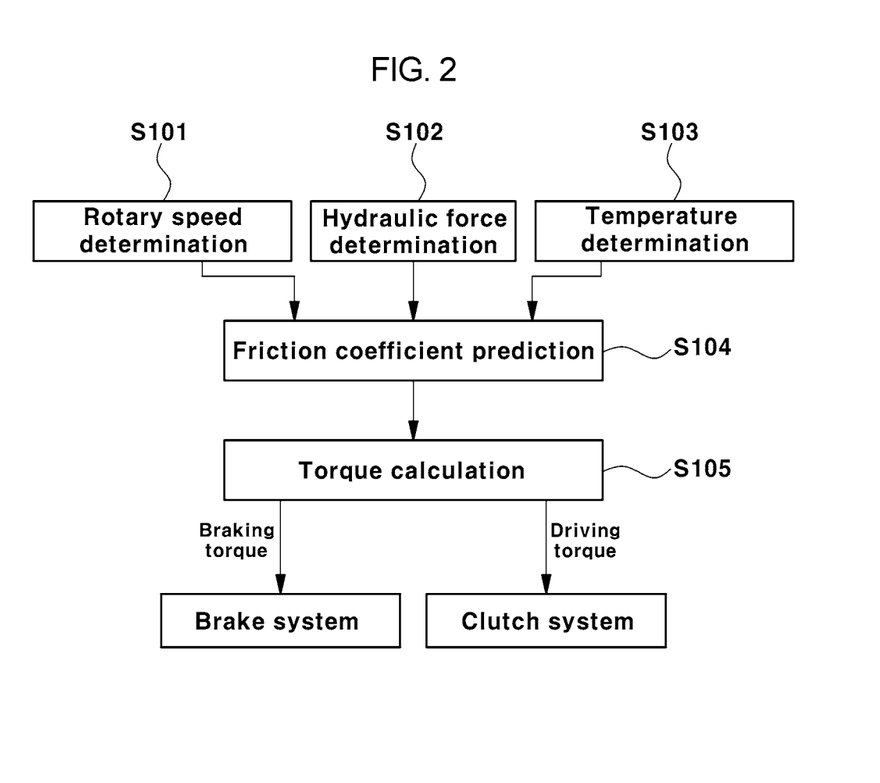
FIG. 2 is a flow chart illustrating a method of evaluating the performance of a vehicle device having a friction component according to various exemplary embodiments of the present invention.

FIG. 1 is a block diagram illustrating a system for evaluating the performance of a vehicle device having a friction component according to various exemplary embodiments of the present invention, and FIG. 2 is a flow chart illustrating a method of evaluating the performance of a vehicle device having a friction component according to various exemplary embodiments of the present invention.

As illustrated in FIG. 1, the system for evaluating the performance of a vehicle device having a friction component, such as a brake disc, a clutch disc, etc., according to various exemplary embodiments of the present invention includes a rotation speed determination unit 10 which is configured to determine a rotation speed of the friction component; a hydraulic pressure determination unit 20 which is configured to determine a hydraulic pressure acting on the friction component; and a temperature determination unit 30 which is configured to determine a temperature of the friction component, to determine the temperature, the rotation speed, the hydraulic pressure, or the like of the friction component, which affects the change in the friction coefficient of the friction component.

The rotation speed determination unit 10 is configured to determine the rotation speed of a brake disc of the brake system among friction components by reflecting the tire rotation radius to the vehicle speed determined by a vehicle speed sensor, and then output the determined friction coefficient to a friction coefficient model 43 mounted on a friction coefficient mounting unit 42 of a controller 40.

For example, the rotation speed determination unit 10 determines the rotation speed (rad/s) of the brake disc through the process of dividing the vehicle speed determined by the vehicle speed sensor by the tire rotation radius, wherein the rotation speed of the brake disc is the same as the tire rotation speed.

Furthermore, the rotation speed determination unit 10 may be adopted as a speed sensor by determining the rotation speed of the clutch disc of the clutch system among the friction components, for example, the rotation speed of the clutch disc and an input shaft of a transmission and providing the determined rotation speed to the friction coefficient model 43, or may provide an input speed, which is input from an engine to a transmission, from a transmission controller to the friction coefficient model 43.

The hydraulic pressure determination unit 20 may be adopted as a hydraulic sensor by determining a hydraulic pressure provided from a master cylinder to a wheel cylinder and acting on the brake disc and providing the determined hydraulic pressure to the friction coefficient model 43, or by determining a hydraulic pressure distributed to a wheel cylinder during the operation of an anti-lock brake system (ABS) device and acting on the brake disc and providing the determined hydraulic pressure to the friction coefficient model 43.

Furthermore, the hydraulic pressure determination unit 20 may provide a hydraulic pressure acting on the clutch disc during the operation of the clutch from the transmission controller to the friction coefficient model 43, or may be adopted as a hydraulic sensor by determining a hydraulic pressure acting on the clutch disc during the operation of the clutch and providing the determined hydraulic pressure to the friction coefficient model 43.

The temperature determination unit 30 may be configured to determine thermal energy (braking energy) of the brake disc during the braking operation on a basis of an environmental condition parameter of a brake disc in friction components, a mechanical or thermal property parameter of a brake disc, a specification parameter according to the specifications a brake pad including a brake caliper, and a brake disc, to determine cooling energy of the brake disc on a basis of the convective and radiative cooling of the brake disc, and then to determine the brake disc temperature as a difference between the thermal energy and the cooling energy of the brake disc.

The temperature determination unit 30 is configured to determine the thermal energy of the brake disc during the braking operation by a conventional thermal energy determination formula using an environmental condition parameter including an ambient temperature and an initial temperature of the brake disc; a mechanical or thermal property parameter of the brake disc, including mass, density, and specific heat, a specification parameter of the brake system, including a piston area of a wheel cylinder pressing a brake pad, and a friction area and an effective radius of the brake disc contacting with the brake pad, to determine the cooling energy of the brake disc by a conventional cooling energy determination formula using convective and radiational cooling of the brake disc, and then to determine the temperature of the brake disc as a difference between the thermal energy and the cooling energy of the brake disc.

For reference, the amount of convective cooling for determining the cooling energy of the brake disc may be determined on a basis of parameters such as the convective cooling coefficient and the convective cooling area of the brake disc, and the amount of radiative cooling may be determined on a basis of parameters such as Stefan Boltzmann constant, emissivity, radiational cooling area, etc.

Alternatively, the temperature determination unit 30 may be adopted as an infrared temperature sensor mounted at a predetermined position of a vehicle body to directly measure the surface temperature of a brake disc or a clutch disc among friction components.

As illustrated in FIG. 1, the performance evaluation system of a vehicle device having a friction component according to various exemplary embodiments of the present invention further includes a controller 40 including a friction coefficient model mounting unit 42, on which the friction coefficient model 43 is interchangeably mounted, and a torque determination unit 44.

The friction coefficient model 43 is configured to predict a single friction coefficient determined on a basis of the rotation speed of the friction component determined by the rotation speed determination unit 10, the hydraulic pressure determined by the hydraulic pressure determination unit 20, and the friction component temperature determined by the temperature determination unit 30, and then output the determined friction coefficient to the torque determination unit 44.

Alternatively, the friction coefficient model 43 may be configured to construct and output a map of friction coefficients (MAP) (also referred to as a 'friction coefficient map') on a basis of three input values including the rotation speed of the friction component determined by the rotation speed determination unit 10, the hydraulic pressure determined by the hydraulic pressure determination unit 20, and the friction component temperature determined by the temperature determination unit 30.

Figure 3:
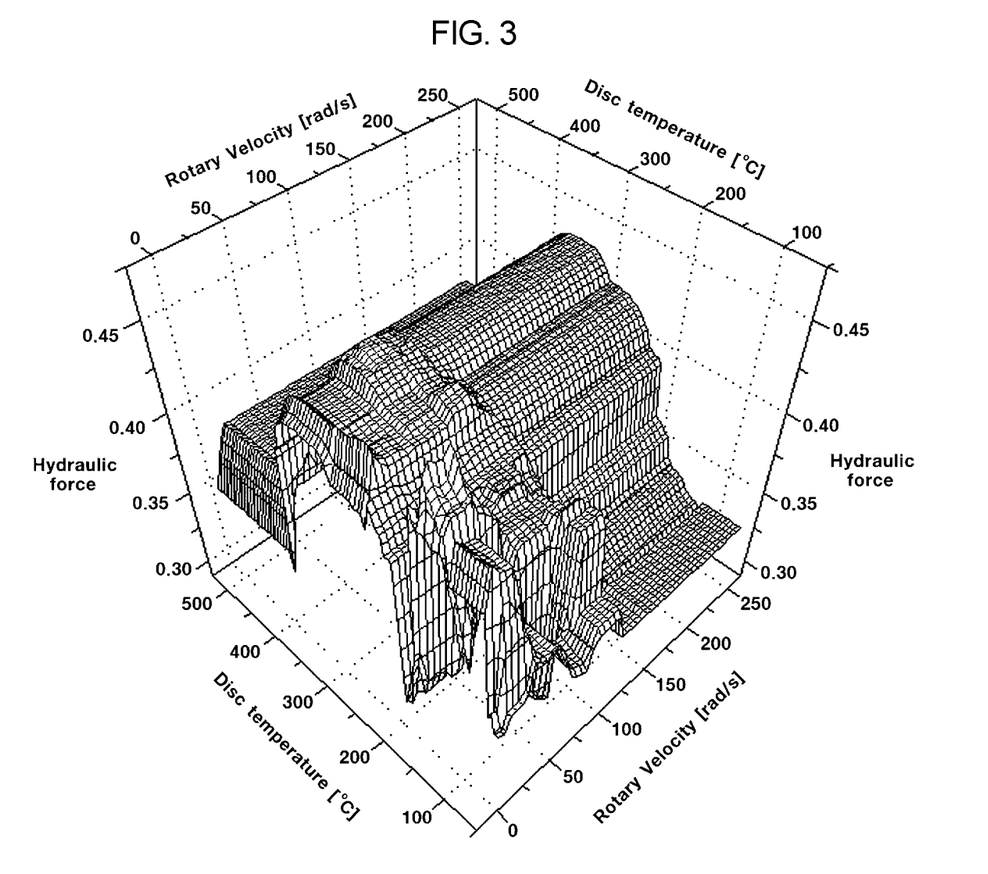
FIG. 3 is a diagram illustrating an example of a friction coefficient map (MAP) constructed and output from a friction coefficient model in the configuration of the performance evaluation system according to various exemplary embodiments of the present invention.

For example, as illustrated in FIG. 3, the friction coefficient map output from the friction coefficient model 43 may be constructed by mapping a change in the rotation speed of the friction component, a change in the hydraulic pressure acting on the friction component, and a change in the temperature of the friction component.

Figure 5:
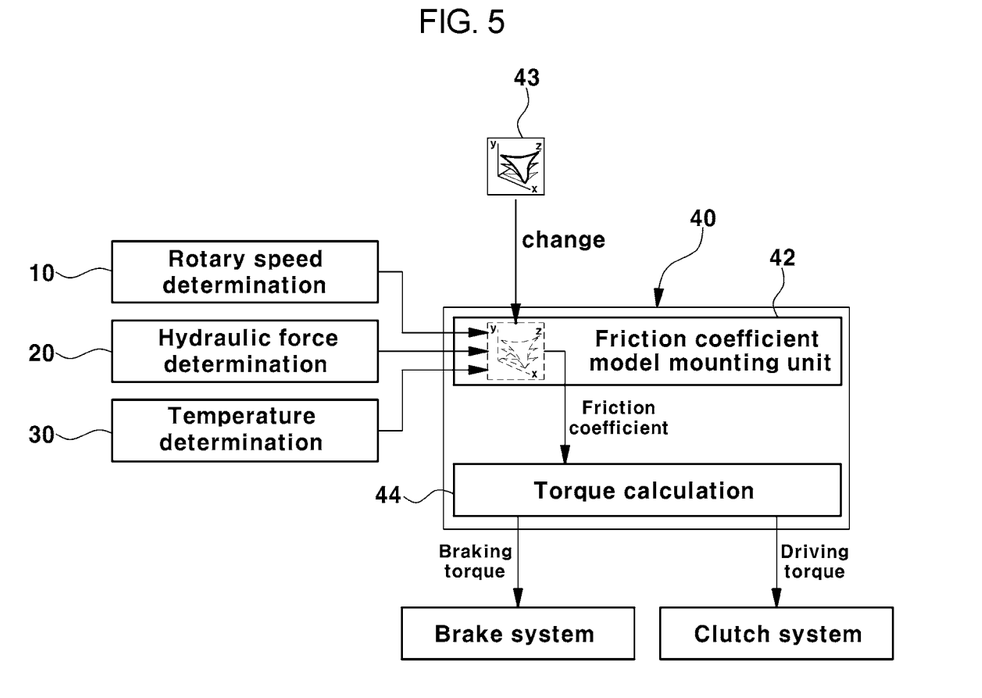
FIG. 5 is a block diagram illustrating that a friction coefficient model is interchangeably mounted on a friction coefficient model mounting unit in the configuration of the performance evaluation system according to various exemplary embodiments of the present invention.

As illustrated in FIG. 5, the friction coefficient model 43 may be provided for each friction component specification, and may be mounted interchangeably on the friction coefficient model mounting unit 42 of the controller 40.

For example, the friction coefficient model 43 may be provided in a form of a memory chip, and may be mounted on the friction coefficient model mounting unit 42 of the controller 40.

Accordingly, in the configuration of the performance evaluation system according to various exemplary embodiments of the present invention, since only the friction coefficient model 43 mounted on the friction coefficient model mounting unit 42 needs to be replaced with a friction coefficient model having a different specification, performance evaluation for a brake system or a clutch system including a friction component with different specifications may be easily obtained.

Thus, the friction coefficient model 43 mounted on the friction coefficient model mounting unit 42 of the controller 40 predicts a single friction coefficient determined from three input values including the rotation speed of the friction component determined by the rotation speed determination unit 10, the hydraulic pressure determined by the hydraulic pressure determination unit 20, and the friction component temperature determined by the temperature determination unit 30, and outputs the predicted friction coefficient to the torque determination unit 44.

On the other hand, the torque determination unit 44 determines the braking torque of a brake system using the friction coefficient of the brake disc output from the friction coefficient model 43, or determines the driving torque of a clutch system using the friction coefficient output from the friction coefficient model 43.

When determining the braking torque applied to the brake system, the torque determination unit 44 may determine the braking torque using a friction coefficient extracted from the friction coefficient model 43, that is, an accurate friction coefficient to which a change in the rotation speed of the brake disc, a change in the hydraulic pressure acting on the brake disc, and a change in the temperature of the brake disc are reflected, so that the braking torque may be determined more accurately.

In the present way, the braking torque determined by the torque determination unit 44 is applied to the vehicle brake system through the brake controller, so that the vehicle brake system may be operated with the braking torque determined by the torque determination unit 44, and thus the performance evaluation of the vehicle brake system may be obtained accurately.

Furthermore, when determining the driving torque of the clutch system, the torque determination unit 44 may determine the driving torque using a friction coefficient extracted from the friction coefficient model 43, that is, an accurate friction coefficient to which a change in the rotation speed of the clutch disc, a change in the hydraulic pressure acting on the clutch disc, and a change in the temperature of the clutch disc are reflected, so that the driving torque of the clutch system may be determined more accurately.

Meanwhile, the performance evaluation system for a vehicle device having a friction component according to various exemplary embodiments of the present invention may be constructed as a virtual wheel brake system or a virtual clutch system.

For example, a vehicle model unit that simulates a vehicle condition using a computer may be constructed, the rotation speed determination unit 10, the hydraulic pressure determination unit 20, the temperature determination unit 30, the controller 40 including the friction coefficient model 43 and the torque determination unit 44, and the like may be constructed as a commercial software including a virtual wheel brake system or a virtual clutch system using a modelica language (MODELICA LANGUAGE) or other programming language, and the constructed software may be availably used for the performance evaluation of the brake system or the clutch system.

Here, a brief description will include the operation of the friction coefficient model 43 mounted on the friction coefficient model mounting unit 42 of the controller 40, in which a single friction coefficient determined from 3 input values including the rotation speed of the friction component, the hydraulic pressure acting on the friction component, the temperature of the friction component is predicted and output.

First, the friction coefficient model 43 may be basically constructed using a machine learning algorithm, in which various functions suitable for the characteristics of the friction coefficient may be selected. Furthermore, to improve the friction coefficient prediction performance, machine learning algorithm tuning for each function or a newly developed function may be further utilized.

As an example, among various machine learning algorithms, the friction coefficient model 43 may be constructed as a conventional decision tree algorithm in which assuming that three variables, such as the rotation speed of the friction component, the hydraulic pressure acting on the friction component, the temperature of the friction component, and the like, are set as INPUT, and a single friction coefficient, i.e., a single variable, is set as OUTPUT, one output value for the above three input values is asked in YES/NO format, the question is repeated until a value determined as "YES" appears, and then a value (R) determined as "YES" is defined as an output value.

Accordingly, by the friction coefficient model 43 constructed by completing the machine learning according to the decision tree algorithm, the single friction coefficient matching the three input values, including the rotation speed of the friction component, the hydraulic pressure acting on the friction component, and the temperature of the friction component, may be output.

As various exemplary embodiments of the present invention, among various machine learning algorithms, the friction coefficient model 43 may be constructed as a conventional random forest algorithm in which assuming that three variables, such as the rotation speed of the friction component, the hydraulic pressure acting on the friction component, the temperature of the friction component, and the like, are set as INPUT, and a single friction coefficient, i.e., a single variable, is set as OUTPUT, a single output value for the three input values is restored and extracted several times and asked in YES/NO format, the question is repeated until a value determined as "YES" is obtained, and then an average value of the values (R) determined by the questions is defined as an output value.

Accordingly, by the friction coefficient model 43 constructed by completing the machine learning according to the random forest algorithm, the single friction coefficient matching the three input values, including the rotation speed of the friction component, the hydraulic pressure acting on the friction component, and the temperature of the friction component, may be output.

As a further example, among various machine learning algorithms, the friction coefficient model 43 may be constructed as a conventional gradient boosting algorithm in which assuming that three variables, such as the rotation speed of the friction component, the hydraulic pressure acting on the friction component, the temperature of the friction component, and the like, are set as INPUT, and a single friction coefficient, i.e., a single variable, is set as OUTPUT, an average of the output values is first determined, and then the result of the tree predicting a difference (RESIDUAL) of the average is repeatedly added to the average of the output values.

Accordingly, by the friction coefficient model 43 constructed by completing the machine learning according to the gradient boosting algorithm, the single friction coefficient matching the three input values, including the rotation speed of the friction component, the hydraulic pressure acting on the friction component, and the temperature of the friction component, may be output.

As a further example, among various machine learning algorithms, the friction coefficient model 43 may be constructed as a conventional long short term memory (LSTM) algorithm in which assuming that three variables, such as the rotation speed of the friction component, the hydraulic pressure acting on the friction component, the temperature of the friction component, and the like, are set as INPUT, and a single friction coefficient, i.e., a single variable, is set as OUTPUT, the previous ten values (number may be tuned) including the current value are applied to model training and the mechanical learning is performed in consideration of the current value with respect to the previous value.

Here, a method of evaluating the performance of a vehicle device having a friction component according to various exemplary embodiments of the present invention will be described below.

Performance Evaluation Method for Brake System

First, the rotation speed of the brake disc among the vehicle friction components, the braking hydraulic pressure acting on the brake disc, and the temperature of the brake disc are determined (S101, S102, and S103).

The rotation speed of the brake disc may be determined by the rotation speed determination unit 10.

For example, in the rotation speed determination unit 10, the rotation speed (rad/s) of the brake disc may be determined by dividing the vehicle speed detected from the vehicle speed sensor by the tire rotation radius, and the determined rotation speed of the brake disc is output to a friction coefficient model 43 mounted on the friction coefficient model mounting unit 42 of the controller 40 (S101).

In the hydraulic pressure determining unit 20, the braking hydraulic pressure may be obtained by measuring the hydraulic pressure provided from the master cylinder to the wheel cylinder, and the measured braking hydraulic pressure is output to the friction coefficient model 43 (S102).

In the temperature determination unit 30, the temperature of the brake disc may be determined as a difference between the thermal energy of the brake disc during braking and the cooling energy of the brake disc during braking, and the determined disc temperature is output to the friction coefficient model 43 (S103).

In the temperature determination unit 30, the temperature of the brake disc may be determined by determining the thermal energy of the brake disc during the braking operation by a conventional thermal energy determination formula using an environmental condition parameter including an ambient temperature and an initial temperature of the brake disc; a mechanical or thermal property parameter of the brake disc, including mass, density, and specific heat, a specification parameter of the brake system, including a piston area of a wheel cylinder pressing a brake pad, and a friction area and an effective radius of the brake disc contacting with the brake pad, determining the cooling energy of the brake disc by a conventional cooling energy determination formula using convective and radiational cooling of the brake disc, and then determining the temperature of the brake disc as a difference between the thermal energy and the cooling energy of the brake disc, wherein the determined temperature of the brake disc is output to the friction coefficient model 43.

For reference, the amount of convective cooling for determining the cooling energy of the brake disc may be determined on a basis of parameters such as the convective cooling coefficient and the convective cooling area of the brake disc, and the amount of radiative cooling may be determined on a basis of parameters such as Stefan Boltzmann constant, emissivity, radiational cooling area, etc.

Alternatively, in the determining a temperature of the friction component, an infrared temperature sensor may be adopted as the temperature determination unit 30 to directly measure the surface temperature of a brake disc.

Subsequently, in the friction coefficient model 43 mounted on the friction coefficient model mounting unit 32 of the controller 40, a single friction coefficient determined on a basis of the rotation speed of the friction component determined by the rotation speed determination unit 10, the braking hydraulic pressure determined by the hydraulic pressure determination unit 20, and the friction component temperature determined by the temperature determination unit 30, and then the determined friction coefficient is output to the torque determination unit 44 (S104).

For example, when three input values including the rotation speed of the brake disc, the hydraulic pressure acting on the brake disc, and the temperature of the brake disc are input to the friction coefficient model 43, the friction coefficient model 43 predicts a single friction coefficient matching the three input values and outputs the predicted friction coefficient to the torque determination unit 44.

Alternatively, a friction coefficient map constructed based on the three input values may be output from the friction coefficient model 43.

The friction coefficient map is constructed in 3D data type to predict a friction coefficient varying according to a change in the rotation speed, a change in the hydraulic pressure, and a change in the temperature of the friction component, so when the friction coefficient model 43 is not mounted on the friction coefficient model mounting unit 42, the friction coefficient map may be stored in the controller 40.

Accordingly, when the friction coefficient model 43 is not mounted on the friction coefficient model mounting unit 42 of the controller 40, if three input values, including the rotation speed of the brake disc, the hydraulic pressure acting on the brake disc, and the temperature of the brake disc, are input to the friction coefficient map, a single friction coefficient matching the three input values may be accurately extracted.

As described above, the friction coefficient model 43 may be provided for each friction component specification and mounted interchangeably on the friction coefficient model mounting unit 42 of the controller 40, so that when the friction coefficient model 43 mounted on the friction coefficient model mounting unit 42 is replaced with a friction coefficient model having a different specification, the performance evaluation for a brake system or a clutch system including friction components with different specifications may be easily performed.

Figure 4:
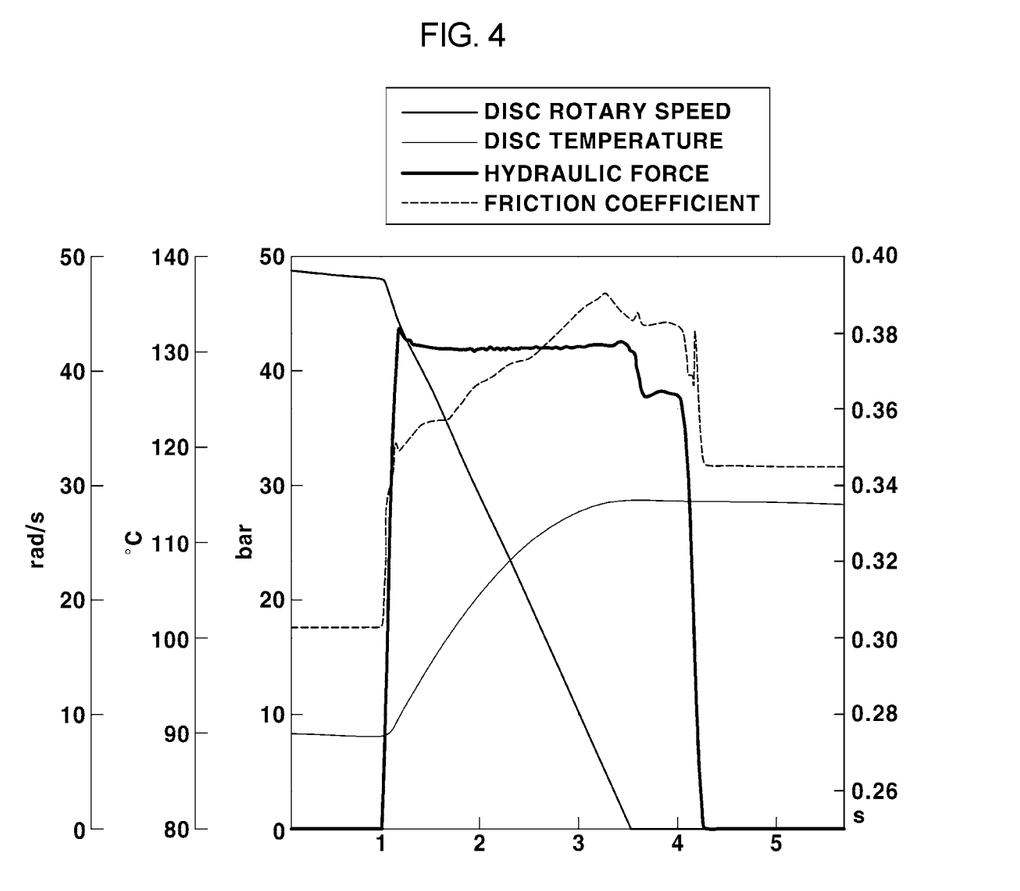
FIG. 4 is a graph illustrating a change in the friction coefficient actually determined by the performance evaluation system and method for the vehicle device having a friction component according to various exemplary embodiments of the present invention.

FIG. 4 is a graph illustrating a change in the friction coefficient actually determined by the performance evaluation system and method for the vehicle device having a friction component according to various exemplary embodiments of the present invention.

Referring to FIG. 4, it could be seen that even when the rotation speed of the brake disc determined by the rotation speed determination unit 10, the hydraulic pressure determined by the hydraulic pressure determination unit 20, and the temperature of the brake disc determined by the temperature determination unit 30 vary according to the driving conditions of a vehicle, the friction coefficient extracted from the friction coefficient model 43 may be determined as a single value matching the rotation speed, the hydraulic pressure, and the temperature of the brake disc.

Next, the torque determination unit 44 determines the braking torque ($Torque_{Brake}$) using a conventional determination formula such as Formula 1 below that reflects the friction coefficient output from the friction coefficient model 43 (S105).

$$Torque_{Brake} = 2 \times \mu \times p \times A_{piston} \times R_{effective} \quad \text{Formula 1}$$

In Formula 1, μ is a friction coefficient, p is a hydraulic pressure, $A_{piston}$ is a piston cross-sectional area of a wheel cylinder, and Reflective is an effective radius of a brake disc.

At the present time, since the friction coefficient used when determining the braking torque by the torque determination unit 44 is an accurate friction coefficient to which a change in the rotation speed of the brake disc, a change in the braking hydraulic pressure, and a change in the temperature of the brake disc are reflected as described above, the braking torque may be determined more accurately.

Therefore, by applying the braking torque determined by the torque determination unit 44 to the vehicle brake system through the brake controller, the vehicle brake system may be operated with the braking torque determined by the torque determination unit 44, and thus the performance evaluation for the vehicle brake system may be made accurately.

Performance Evaluation Method for Clutch System

First, the rotation speed of a clutch disc coupled to an input shaft of a transmission in the vehicle friction components, the hydraulic pressure acting on the clutch disc, and the temperature of the clutch disc are determined (S101, S102, and S103).

The rotation speed of the clutch disc may be determined by the rotation speed determination unit 10.

For example, the rotation speed of the input shaft and the clutch disc of the transmission is detected by the speed sensor and output to the friction coefficient model 43, or otherwise the input speed input from the engine to the transmission is received from the transmission controller and output to the friction coefficient model 43 (S101).

The hydraulic pressure is measured by a hydraulic sensor adopted as the hydraulic pressure determining unit 20 and output to the friction coefficient model 43 (S102).

For example, the amount of hydraulic pressure acting on the clutch disc during the clutch coupling operation is measured by the hydraulic sensor and output to the friction coefficient model 43 of the controller 40 (S102).

The temperature of the clutch disc is measured by an infrared temperature sensor adopted as the disc temperature determining unit 30 and output to the friction coefficient model 43 (S103).

Subsequently, in the friction coefficient model 43 mounted on the friction coefficient model mounting unit 32 of the controller 40, a single friction coefficient determined on a basis of the rotation speed of the clutch disc output from the rotation speed determination unit 10, the hydraulic pressure output from the hydraulic pressure determination unit 20, and the clutch disc temperature output from the temperature determination unit 30 is extracted and output (S104).

For example, when three input values including the rotation speed of the clutch disc, the hydraulic pressure acting on the clutch disc, and the temperature of the clutch disc are input to the friction coefficient model 43, the friction coefficient model 43 predicts a single friction coefficient matching the three input values and outputs the predicted friction coefficient to the torque determination unit 44.

Alternatively, a friction coefficient map constructed based on the three input values may be output from the friction coefficient model 43.

The friction coefficient map is constructed to obtain a friction coefficient varying according to a change in the rotation speed, a change in the hydraulic pressure, and a change in the temperature of the clutch disc, so when the friction coefficient model 43 is not mounted on the friction coefficient model mounting unit 42, the friction coefficient map may be stored in the controller 40.

Accordingly, when the friction coefficient model 43 is not mounted on the friction coefficient model mounting unit 42 of the controller 40, if three input values, including the rotation speed of the clutch disc, the hydraulic pressure acting on the clutch disc, and the temperature of the clutch disc, are input to the friction coefficient map, a single friction coefficient matching the three input values may be accurately extracted.

Referring to FIG. 4, it could be seen that even when the rotation speed of the clutch disc determined by the rotation speed determination unit 10, the hydraulic pressure determined by the hydraulic pressure determination unit 20, and the temperature of the clutch disc determined by the temperature determination unit 30 vary according to the driving conditions of a vehicle, the friction coefficient extracted from the friction coefficient model 43 may be determined as a single value matching the rotation speed, the hydraulic pressure, and the temperature of the clutch disc.

Next, the torque determination unit 44 determines the driving torque using a conventional determination formula that reflects the friction coefficient output from the friction coefficient model 43 (S105).

At the present time, when determining the driving torque of the clutch system by the torque determination unit 44, the friction coefficient determined and output from the friction coefficient model 43, i.e., an accurate friction coefficient to which a change in the rotation speed of the clutch disc, a change in the hydraulic pressure acting on the clutch disc, and a change in the temperature of the clutch disc are reflected, is used, so that the driving torque of the clutch system may be determined more accurately.

Therefore, by applying the driving torque of the clutch system determined by the torque determination unit 44 to the clutch system through the transmission controller, the driving torque for the acceleration of a vehicle through the coupling of the clutch disc with the clutch friction material may employ the driving torque determined by the torque determination unit 44, and thus the performance evaluation for the clutch system in the vehicle transmission may be made accurately.

Furthermore, the term "controller", "control unit" or "control device" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for evaluating performance of a vehicle device having a friction component, the system comprising:
    a rotation speed determination unit configured to determine a rotation speed of the friction component of the vehicle device;
    a hydraulic pressure determination unit configured to determine a hydraulic pressure acting on the friction component;
    a temperature determination unit configured to determine a temperature of the friction component;
    a friction coefficient modeling unit configured to predict and output a friction coefficient on a basis of three or more input values, including the rotation speed determined by the rotation speed determination unit, the hydraulic pressure determined by the hydraulic pressure determination unit, and the temperature of the friction component determined by the temperature determination unit; and
    a torque determination unit configured to determine an operating torque of the friction component using the friction coefficient output from the friction coefficient modeling unit,
    wherein the friction coefficient modeling unit is configured to construct and output a map of friction coefficients determined on a basis of input values including a variation in the rotation speed of the friction component, a variation in the hydraulic pressure acting on the friction component, and a variation in the temperature of the friction component.

2. The system according to claim 1, wherein the friction component is a brake disc being selectively in a contact with a friction material of a brake system, or a clutch disc being selectively in a contact with a friction material of a clutch system.

3. The system according to claim 1, wherein the rotation speed determination unit is configured to determine a rotation speed of a brake disc of a brake system by correlating a rotation radius of a tire to a vehicle speed detected by a vehicle speed sensor.

4. The system according to claim 1, wherein the temperature determination unit is configured to determine a temperature of a brake disc as a difference between thermal energy and cooling energy of the brake disc during braking operation of the brake disc.

5. The system according to claim 4,
    wherein the thermal energy of the brake disc is determined on a basis of an environmental condition parameter including an ambient temperature and an initial temperature of the brake disc, a mechanical or thermal property parameter including mass, density, and specific heat, a specification parameter including a piston area of a wheel cylinder pressing a brake pad, and a friction area and an effective radius of the brake disc contacting with the brake pad, and
    wherein the cooling energy of the brake disc is determined on a basis of an amount of convective and radiational cooling of the brake disc.

6. The system according to claim 1, wherein the temperature determination unit is an infrared temperature sensor configured to measure the temperature of the friction component.

7. The system according to claim 1, wherein a friction coefficient model is provided in a form of a memory chip for each of friction component specifications, and is replaceably mounted on a controller including the friction coefficient model mounting unit and the torque determination unit.

8. A method of evaluating performance of a vehicle device having a friction component, the method comprising:
    determining a rotation speed of the friction component;
    determining a hydraulic pressure acting on the friction component;
    determining a temperature of the friction component;
    predicting and outputting, by a controller, a friction coefficient matching the determined rotation speed, the determined hydraulic pressure, and the determined temperature of the friction component; and
    determining an operating torque of the friction component using the output friction coefficient,
    wherein the method further includes constructing and outputting a map of friction coefficients determined on a basis of input values including a variation in the rotation speed of the friction component, a variation in the hydraulic pressure acting on the friction component, and a variation in the temperature of the friction component.

9. The method according to claim 8, wherein the friction component is a brake disc being selectively in a contact with a friction material of a brake system, or a clutch disc being selectively in a contact with a friction material of a clutch system.

10. The method according to claim 8, wherein in the determining a rotation speed of the friction component, a rotation speed of a brake disc is determined by dividing a vehicle speed detected by a vehicle speed sensor by a rotation radius of a tire.

11. The method according to claim 8, wherein in the determining a temperature of the friction component, a temperature of a brake disc is determined by a difference between thermal energy and cooling energy of the brake disc during braking operation of the brake disc.

12. The method according to claim 11,
wherein the thermal energy of the brake disc is determined on a basis of: an environmental condition parameter including an ambient temperature and an initial temperature of the brake disc, a mechanical or thermal property parameter including mass, density, and specific heat, and a specification parameter including a piston area of a wheel cylinder pressing a brake pad, and a friction area and an effective radius of the brake disc contacting with the brake pad, and
wherein the cooling energy of the brake disc is determined on a basis of an amount of convective and radiational cooling of the brake disc.

13. The method according to claim 8, wherein in the determining a temperature of the friction component, the temperature of the friction component is measured by an infrared temperature sensor.

14. The method according to claim 8, wherein the predicting and outputting a friction coefficient includes:
inputting, to a friction coefficient model, input values including the rotation speed, the hydraulic pressure, and the temperature of the friction component; and
outputting the friction coefficient determined from the input values in the friction coefficient model in a form of a memory chip, or constructing and outputting the map of friction coefficients determined on a basis of the input values.

15. The method according to claim 14, wherein the friction coefficient model is provided in a form of a memory chip for each of friction component specifications, and is replaceably mounted on a friction coefficient model mounting unit of the controller including the friction coefficient model mounting unit.

16. The method according to claim 14, wherein the map of the friction coefficients is stored in the controller to output the friction coefficient determined from the input values when the friction coefficient model is not mounted on the friction coefficient model mounting unit of the controller.

17. The method according to claim 14, further including:
applying, by the controller, a braking torque to the friction component of a brake system of the vehicle or applying, by the controller, the determined operating torque to the friction component of a clutch system of the vehicle.

18. The method of claim 8, wherein the controller includes:
a processor; and
a non-transitory storage medium on which a program for performing the method of claim 8 is recorded and executed by the processor.

* * * * *